UNITED STATES PATENT OFFICE.

CHARLES F. BURGESS, OF MADISON, WISCONSIN.

ALLOY FOR COATING WITH METAL.

1,014,751.   Specification of Letters Patent.   Patented Jan. 16, 1912.

No Drawing.   Application filed June 10, 1911. Serial No. 632,440.

*To all whom it may concern:*

Be it known that I, CHARLES F. BURGESS, a citizen of the United States, residing at Madison, in the county of Dane and State of Wisconsin, have invented certain new and useful Improvements in Alloys for Coating with Metal, of which the following is a specification.

My present invention comprises a method whereby an alloy or composition of matter in granular form and consisting largely of zinc, may be produced in condition for use in coating iron to protect it from corrosion.

According to the well known method of hot galvanizing, the iron or steel articles to be coated are dipped in fused zinc, which is held in an iron receptacle with a layer of sal-ammoniac floating on its surface to serve as a flux. It is well known that the molten zinc dissolves off some of the iron of the article under treatment, and also eats away the iron tank or receptacle by combining therewith. It is also known that the combined zinc and iron settle at the bottom of the tank, and must be taken out from time to time, otherwise the bath becomes dirty and will not stay sufficiently liquid at the working temperature of the flux. The material thus removed from the hot galvanizing bath analyzes about 3% to 7% iron, 85% to 95% zinc, and 2% to 5% lead, with certain other elements or components in small percentages. This material is sold on the market at a relatively low price as "dross." The material is somewhat harder than zinc, and relatively tough and strong.

According to the preferred embodiment of the present invention, galvanizer's dross is utilized as the basis for the production, in novel manner, of an alloy or composition of matter containing zinc, iron and lead, and possibly small amounts of other elements, this material having extreme brittleness, and having also other special characteristics which render it valuable for use in the arts.

To make up the alloy or composition, zinc dross of ordinary commercial purity is crushed or broken into lumps and is then placed in a rotary iron drum, together with a quantity of relatively pure iron, such as wrought iron, or electrolytic iron, in the form of chunks or small pieces. This charge of dross and iron is then heated to red heat (about 850 degrees Fahr.), with continued rotation of the drum. I have found that at this temperature, which is well below the melting point of the dross, the iron and dross appear to combine, and the iron, as such, disappears. By adding the iron in suitable proportions, all of the iron may be caused to combine with the dross. The material produced by union of the iron and dross is exceedingly brittle, and the rotation of the drum causes the lumps or particles to grind on one another, thereby reducing substantially the entire charge to a granular condition. The size of the granular particles is not uniform throughout the mass, and although most of the mass is fine enough to be passed through a forty-mesh sieve, much of it is too coarse to pass through a sixty-mesh sieve. This variation in the size of the granules is of importance, as hereinafter pointed out. The alloy, when thus reduced to granular condition, is not readily inflammable and can be exposed to the air, even at red heat, without igniting. It can be heated to a temperature in the neighborhood of 1300 degrees Fahr. without fusion and without sintering of the particles into a coherent mass. In this respect, it is quite different from pulverized zinc, which fuses at about 740 degrees Fahr. " zinc dust," which contains some zinc oxid, sinters together more easily than does this granular alloy. When in granular condition, the alloy is light gray, and the individual granules or particles appear to be regularly crystalline in structure. It is difficult to express, by chemical symbols, the exact chemical relation between the zinc, the iron and the lead, which comprise this granular material, particularly as it may be that the lead is present in chemical combination only to a slight extent. It is a fact well known in the art of hot galvanizing, that the addition of iron to a molten bath of zinc and lead causes partial separation of the lead and zinc, throwing the lead down as metallic lead at the bottom of the vat. Something of this sort may go on when iron is tumbled with zinc dross, and even though the product produced by tumbling may contain some lead combined with the zinc and iron, there may be some additional lead distributed throughout the mass in a finely divided condition and so related to the other components of the granular material that it can take part in chemical actions involving a change in composition of the zinc-iron alloy with which the lead is associated. Probably the granular product can best be described in chemical terms as consisting of an alloy of about the composition $FeZn_{10}$.

Granular material, produced as above described, is in condition for use according to a method which I have described and claimed in my co-pending application, Serial No. 552,940, filed April 2, 1910. According to that process, an iron article is subjected to heat treatment while in contact with a brittle zinc alloy, with the result that the iron article takes on a protective coating. During this operation, the fine particles of the granular material come into intimate contact with the iron, while the larger particles serve as grinding or scouring agents to smooth the surface of the iron and of the coating while the coating is being produced.

Under some circumstances, it is best that the granular material should contain more zinc than is represented by the symbol $FeZn_{10}$. This excess zinc may be put in by again tumbling the granular mass after adding lumps or chunks of zinc, or of galvanizer's dross, as disclosed and claimed in my co-pending application, Serial No. 595,205, filed December 2, 1910.

In application Serial No. 567,244, filed by me June 16, 1910, claims are made on the method of coating a metal article by heat treatment in the presence of a zinc iron alloy enriched with additional zinc.

What I claim as new and desire to secure by Letters Patent of the United States is:—

1. The method which consists in adding iron to heated zinc dross until the chemical composition becomes about $FeZn_{10}$, and mechanically reducing the material so obtained to granular condition while hot.

2. The method which consists in saturating heated zinc dross with iron and simultaneously reducing to granular condition the material so produced.

3. The method of making a granular material consisting essentially of zinc and iron, which consists in tumbling zinc dross at about red heat in the presence of iron.

4. The method of making a granular alloy of about the composition $FeZn_{10}$, which consists in tumbling materials rich in zinc and iron at about red heat until the zinc and iron unite to form a brittle alloy and until the alloy is mechanically reduced to granular condition.

In witness whereof, I hereunto subscribe my name this 1st day of June, 1911.

CHARLES F. BURGESS.

Witnesses:
WM. R. BAGLEY,
J. B. RAMSAY.